United States Patent
Wang et al.

(10) Patent No.: US 12,534,553 B2
(45) Date of Patent: Jan. 27, 2026

(54) STIFF BLOWN FILM

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Matthias Hoff, Linz (AT)

(73) Assignee: BOREALIS AG, Vienna (AT)

( * ) Notice: Subject to any disclaimer, the term of this patent is extended or adjusted under 35 U.S.C. 154(b) by 717 days.

(21) Appl. No.: 17/797,183

(22) PCT Filed: Mar. 17, 2021

(86) PCT No.: PCT/EP2021/056819
§ 371 (c)(1),
(2) Date: Aug. 3, 2022

(87) PCT Pub. No.: WO2021/191020
PCT Pub. Date: Sep. 30, 2021

(65) Prior Publication Data
US 2023/0060604 A1 Mar. 2, 2023

(30) Foreign Application Priority Data
Mar. 24, 2020 (EP) .................................. 20165147

(51) Int. Cl.
*C08F 210/06* (2006.01)
*C08F 210/08* (2006.01)
*C08J 5/18* (2006.01)
*C08L 23/14* (2006.01)

(52) U.S. Cl.
CPC .......... *C08F 210/06* (2013.01); *C08F 210/08* (2013.01); *C08J 5/18* (2013.01); *C08L 23/142* (2013.01); *C08F 2420/00* (2013.01); *C08J 2323/14* (2013.01); *C08L 2203/162* (2013.01); *C08L 2205/025* (2013.01); *C08L 2205/24* (2013.01); *C08L 2314/06* (2013.01)

(58) Field of Classification Search
CPC ...... C08F 210/06; C08F 210/08; C08L 23/14; C08L 23/142; C08L 2203/16; C08L 2203/152; C08J 5/18
See application file for complete search history.

(56) References Cited

U.S. PATENT DOCUMENTS

| 6,248,829 B1 * | 6/2001 | Fischer | .................. C08F 10/06 525/197 |
| 2006/0276607 A1 | 12/2006 | Ikenaga et al. | |

FOREIGN PATENT DOCUMENTS

| CN | 109689707 A | 4/2019 |
| EP | 0943631 A1 | 9/1999 |
| EP | 1947143 A1 * | 7/2008 |
| EP | 2020291 A1 | 2/2009 |
| EP | 2586801 B1 | 12/2014 |
| EP | 3257878 A | 12/2017 |
| WO | 2004087775 A1 | 10/2004 |
| WO | 2017216093 A1 | 12/2017 |
| WO | WO2018122263 A1 * | 7/2018 |

OTHER PUBLICATIONS

First Examination of Indian application 202217060393, Dated Feb. 22, 2024.
International Search Report of Application No. PCT/EP2021/056819 Dated May 31, 2021.
Christine Paulik et. al,. Catalyst Type Effects on Structure/Property Relations of Polypropylene Random Copolymers; www.mcp-journal.de 2021 The Authors. Macromolecular Chemistry and Physics published by Wiley-VCH GmbH; pp. 1-21.

* cited by examiner

*Primary Examiner* — Jeffrey S Lenihan
(74) *Attorney, Agent, or Firm* — Lippes Mathias LLP

(57) ABSTRACT

Blown films, especially monolayer blown films, of high stiffness, the blown films comprising at least 95.0 wt % of a specific propylene-1-butene random copolymer.

19 Claims, No Drawings

STIFF BLOWN FILM

CROSS REFERENCE TO RELATED APPLICATIONS

This is a 371 of PCT Application No. PCT/EP2021/056819, filed Mar. 17, 2021, which claims the benefit of European Application No. 20165147.8, filed Mar. 24, 2020, the contents of which are incorporated herein in their entirety This invention relates to blown films, especially monolayer blown films, of high stiffness, the blown films comprising at least 95.0 wt % of a specific propylene-1-butene random copolymer.

BACKGROUND

Polypropylenes succeed more and more to replace polyethylenes in many technical fields as quite often the new generation of polypropylenes have enhanced properties compared to conventional polyethylene materials. This applies also for the field of blown films where polypropylene takes advantage of molecular engineering to overcome previous material shortcomings for blown-film production.

The blown films sector constitutes an area of ever-increasing importance in various application segments, such as industry packaging, consumer packaging, bags and sacks, lamination films, barrier films, packaging of food or medical products, agriculture films, hygienic products and products for packaging in general.

Polypropylene is applicable in areas where sealing properties play an important role, like in the food packaging industry, especially when a good combination of transparency and mechanical performance is desired. Such a combination is difficult to achieve if the material should be suitable for sealing layers of multi-layer films, which require a good balance between sealing initiation temperature (SIT) and hot tack force (HTF). A combination of lower SIT and higher HTF allows the converter to run the lines during the packaging step at higher speeds, but the overall performance of the film construction will only be satisfactory if the sealing layer is sufficiently flexible, tough and transparent.

To ensure fast sealing, a low SIT is of advantage. By operating at lower temperature there is the benefit that the article to be sealed is not exposed to high temperatures. There are also economical advantages, since lower temperatures are of course cheaper to generate and maintain.

There are further advantages in avoiding high sealing temperatures, especially when temperature sensitive goods are to be packed.

Furthermore, it is also desired to have a packaging material with satisfactory optical properties, such as low haze and/or high clarity.

In addition of course the standards issued by the food and drug administration (FDA), i.e. inter alia having low amounts of extractables, like C6-solubles (C6 FDA), should be met.

Currently, C2C3 copolymers are widely used in film applications due to the excellent combination of cost and properties range. One can easily get stiff/transparent films or low Tm random copolymers for sealing layers. The majority of such C2C3 copolymers are made via ZN catalysts, which create many oligomers and moreover, in order to reach a low Tm, one must use a high amount of comonomers, which creates even more oligomers and thereby influences the food contact compliance in a negative way.

There have been some proposals to solve these problems, e.g. use of butene as comonomer. However, due to the intrinsic drawback of ZN catalyst in copolymerization of C3 with C4 or higher comonomers, there is still a need for improved solutions.

Several attempts to solve the above mentioned problems have been proposed

EP 3257878 A1 discloses a nucleated propylene-butylene-copolymer which (i) has been produced in the presence of a Ziegler-Natta catalyst and is (ii) free of phthalic acid esters as well as their respective decomposition products, and comprises—based on the total weight of the propylene-butylene copolymer—(A) 88.0-96.0 wt % of propylene, (B) 4.0-12.0 wt % of 1-butylene, wherein the nucleated propylene-butylene copolymer is further characterised by (a) a molecular weight distribution (MWD) of at least 5.0 when measured according to ISO16014. The key drawback of the compositions of the Inventive Examples is the high $MFR_2$ of around 7.0 g/10 min, for which reason these compositions cannot be used for blown film.

Furthermore, such compositions have a quite high MWD, i.e. a higher content of low molecular weight material, and/or a high Xylene Cold Soluble (XCS) fraction. Both factors limit the applicability in pharmaceutical and food packaging, where a low content of extractable material is generally desired.

EP 1442078 B1 describes propylene polymer compositions comprising: (A) from 15 to 60 wt % of a copolymer of propylene with C4-C8 alpha-olefin(s), containing more than 10.0 wt %, but less than 14.0 wt %, of said C4-C8 alpha-olefin(s); (B) from 40 to 85 wt % of a copolymer of propylene with C4-C8 alpha-olefin(s), containing from 14.0 to 30.0 wt % of said C4-C8 alpha-olefin(s), and optionally from 0.5 to 3 wt % of ethylene; provided that the total content of C4-C8 alpha-olefin(s) in the propylene polymer composition is higher than 10.0 wt %.

In the Examples, the random copolymers are produced in the presence of a Ziegler-Natta catalyst. The polymers have quite high Hexane Soluble fractions of 3.1 wt % and above, likewise limiting applicability.

EP 2586801 B1 describes a propylene-butene-1 random copolymer, having a butene-1 content of 1.0-6.0 mol %, preferably 3.0-6.0 mol %, and a relative dispersity of butene-1, as determined according to NMR method, of greater than 98.5%, preferably greater than 99.0%. In the Examples, the random copolymers are produced in the presence of a Ziegler-Natta catalyst including a phthalate based internal donor, whereby the catalysts used in the Inventive Examples were additionally subjected to a pre-complexation treatment. Due to their high $MFR_2$ of at least 4.0 up to 9.3 these polymers are not suitable for producing blown films. The possible effect of modifying the MFR into the desired range on optical and mechanical performance is unclear.

Single-site catalysts are also already well known in the field of producing polypropylene. They are increasingly used for copolymerization of propylene with other comonomers, due to their highly random insertion of the comonomer units along the chain. A highly random comonomer insertion is known to improve the optical behaviour. The inherently narrow molecular weight distribution (MWD) resulting from polymerization with said single-site catalysts furthermore reduces the amount of extractable fractions.

Said highly random comonomer insertion of single-site based polypropylenes can however cause disadvantages for mechanical properties of the final polymer: As a consequence of this highly random comonomer distribution, these polypropylene grades tend to become much less stiff than Ziegler-Natta grades at a similar comonomer content, nevertheless providing lower impact behaviour. Said stiffness reduction is aggravated by the aforementioned narrow MWD.

To overcome the above stated problems new blown films are desired. Thus the object of the present invention is to provide a blown film with good mechanical properties, like high stiffness, based on polypropylene, which can be converted into a blown film with high output rates. It is in particular preferred that the blown film can be used for food and/or medical packaging without the risk of heat damage and/or without the risk of contamination of said products.

The finding of the present invention is to provide a blown film based on polypropylene, i.e. a specific propylene-1-butene random copolymer produced with a single-site catalyst.

Preferably the blown film is free of polyethylene, even more preferred the blown film comprises a polypropylene as defined above and further defined below as the only polymer component.

Surprisingly, it has been found that blown films based on the specific propylene-butene random copolymer produced with a single-site catalyst, have superior properties compared to the films known in the art. The inventive blown films are characterized by a high stiffness at a low heat sealing initiation temperature (SIT) in comparison to blown films being state of the art. Moreover, the inventive blown films are characterized by good optical properties, improved sealing behaviour due to low sealing initiation temperature (SIT) and high hot tack force (HTF), and in addition having low hexane soluble fraction.

Thus, according to a first aspect the present invention is directed to blown films comprising at least 95.0 wt % of a propylene-butene random copolymer, the propylene-1-butene random copolymer having a) a melt flow rate ($MFR_2$; 230° C./2.16 kg; measured according to ISO 1133) in the range of from 0.5 to below 4.0 g/10 min, b) a 1-butene content in the range of from 2.0 to 15.0 wt % based on the total weight of the propylene-1-butene random copolymer and c) a xylene cold soluble (XCS) fraction measured according to ISO 16152 at 25° C. in the range of from 0.10 to 2.80 wt %, d) a molecular weight distribution (Mw/Mn) of less than 4.5 and e) said copolymer is prepared using a single site catalyst, said blown film having i) a Tensile modulus, in machine and transverse direction according to ISO 527-3 at 23° C. measured on 50 μm blown films, in the range of from 700 to 1800 MPa.

DETAILED DESCRIPTION

In the following, the invention is defined in more detail.

The blown films according to the present invention comprise at least 95.0 wt % of a propylene-1-butene random copolymer.

Propylene-1-Butene Random Copolymer

By "random" copolymer is meant a copolymer in which the comonomer units are randomly distributed within the copolymer. Specifically in the context of the present invention, the propylene-1-butene random copolymer is thus a polymer in which the 1-butene comonomer units are randomly distributed within the copolymer.

As used herein, the term "propylene-1-butene random copolymer" or "propylene-1-butene copolymer" encompasses polymers being polymerized from propylene, and 1-butene monomer units. Therefore, the propylene-1-butene copolymer consists of propylene and 1-butene monomer units. The propylene-1-butene copolymer is understood to be substantially free of ethylene derived monomer units, e.g. comprises less than 0.1 wt % ethylene, preferably less than 0.01 wt % ethylene, more preferably less than 0.001 wt % of ethylene comonomer.

The propylene-1-butene copolymer of the present invention comprises—based on the total weight of the propylene-1-butene copolymer 85.0-98.0 wt % of propylene and 2.0-15.0 wt % of 1-butene.

Preferably, the amount of 1-butene is in the range of 3.0 to 13.0 wt %, more preferably in the range of 3.5 to 11.5 wt %, like in the range of 4.0 to 11.0 wt %, thus the amount of propylene is preferably in the range of 87.0 to 97.0 wt %, more preferably in the range of 88.5 to 96.5 wt %, like 89.0 to 96.0 wt %.

The $MFR_2$ (230° C./2.16 kg, ISO 1133) of the propylene-1-butene copolymer is in the range of from 0.5 to below 4.0 g/10 min.

The $MFR_2$ of the propylene-1-butene copolymer is preferably in the range of 0.7 to 3.8 g/10 min, more preferably in the range of from 0.8 to 3.5 g/10 min and even more preferably in the range of from 0.9 to 3.0 g/10 min.

Furthermore, the amount of solubles of the propylene-1-butene copolymer shall be rather low. Accordingly, the amount of xylene cold solubles fraction determined at 25° C. according ISO 16152; 2005 of the copolymers shall be in the range of from 0.10 to 2.80 wt %, preferably of from 0.20 to 2.50 wt %, more preferably of from 0.30 to 2.20 wt %, even more preferably of from 0.40 to 2.00 wt % and most preferably of from 0.50 to 1.90 wt %.

Xylene cold solubles are the part of the polymer soluble in cold xylene determined by dissolution in boiling xylene and letting the insoluble part crystallize from the cooling solution. The xylene solubles fraction contains polymer chains of low stereo-regularity and is an indication for the amount of non-crystalline areas.

The propylene-1-butene copolymer has a molecular weight distribution Mw/Mn, being the ratio of the weight average molecular weight Mw and the number average molecular weight Mn, of 2.0 to less than 4.5, preferably in the range of 2.0 to 4.2, like in the range of 2.5 to 4.0.

According to an embodiment of the present invention, the propylene-1-butene copolymer has an amount of hexane hot solubles (C6 FDA) measured on a 100 μm thick blown film according to FDA 177.1520 in the range of from 0.1 to less than 2.0 wt %, preferably in the range of from 0.2 to 1.7 wt %, more preferably in the range of from 0.3 to 1.5 wt % and even more preferably in the range of from 0.4 to 1.4 wt %.

According to a further embodiment of the present invention, the propylene-1-butene copolymer preferably has a flexural modulus determined according to ISO 178 in the range of from 700 to 1800 MPa, more preferably in the range of from 750 to 1600 MPa, and even more preferably in the range of from 800 to 1400 MPa.

Alternatively or in addition, the propylene-1-butene copolymer preferably has a Charpy notched impact strength at 23° C., determined according to ISO 179 1eA, in the range of from 2.0 kJ/m² to 10.0 kJ/m², preferably from 2.5 to 9.0 kJ/m² and more preferably from 3.0 to 7.0 kJ/m² and/or a haze measured according to ASTM D1033 on a 1.0 mm thick plaque in the range of from 5.0 to below 70.0%, preferably from 7.5 to 60.0% and more preferably from 10.0 to 55.0%.

In a further embodiment, the propylene-1-butene copolymer is preferably bimodal in view of the comonomer content and/or the $MFR_2$ and consists of polymer fractions (A) and (B).

Thus, according to said embodiment the propylene-1-butene copolymer preferably comprises: 30.0 to 70.0 wt % of a propylene-1-butene copolymer (A) having an $MFR_2$ of 0.5 to 20.0 g/10 min and a 1-butene content of 2.0 to 10.0 wt %; and 70.0 to 30.0 wt % of a propylene-1-butene copolymer (B) having an $MFR_2$ of 0.5 to 20.0 g/10 min and a 1-butene content of 3.5 to 20.0 wt %;

wherein copolymers (A) and (B) are different and the amount of (A) and (B) sums up to 100.0%.

(i) Propylene-1-Butene Copolymer (A)

Fraction (A) is a propylene-1-butene copolymer component. Typically, fraction (A) consists of a single propylene-1-butene copolymer.

The 1-butene content in copolymer (A) is in the range 2.0 to 10.0 wt % relative to the total weight of the copolymer, preferably 3.0 to 9.0 wt %, more preferably 4.0 to 8.0 wt %.

The propylene-1-butene copolymer (A) of the invention has a melt flow rate ($MFR_2$) of 0.5 to 20.0 g/10 min. Typically, the propylene-1-butene copolymer (A) has an $MFR_2$ of 15.0 g/10 min or less, preferably 12.0 g/10 min or less, preferably 10.0 g/10min or less. The polymer preferably has a minimum $MFR_2$ of 1.0 g/10 min, preferably 1.5 g/10 min, such as 2.0 g/10 min. Thus, particularly suitable values of $MFR_2$ are from 1.0 to 15.0 g/10 min, preferably 1.5 to 12.0 g/10 min, such as 2.0 to 10.0 g/10 min.

The propylene-1-butene copolymer fraction (A) is present in an amount of 30.0 to 70.0 wt %, preferably 35.0 to 65.0 wt %, more preferably 37.0 to 60.0 wt %.

(ii) Propylene-1-Butene Copolymer (B)

Fraction (B) is also a propylene-1-butene copolymer component. The 1-butene content in copolymer (B) is in the range 3.5 to 20.0 wt % relative to the total weight of the copolymer, preferably 3.7 to 18.0 wt %, more preferably 3.8 to 16.0 wt %.

The propylene-1-butene copolymer (B) of the invention has a melt flow rate ($MFR_2$) of 0.5 to 20.0 g/10 min. Typically, the propylene-1-butene copolymer (B) has an $MFR_2$ of 15.0 g/10 min or less, preferably 12.0 g/10 min or less, more preferably 10.0 g/10min or less, such as 8.0 g/10 min or less. Thus, particularly suitable values of $MFR_2$ are from 0.5 to 10.0 g/10 min, such as 0.5 to 8.0 g/10 min.

The propylene-1-butene copolymer fraction (B) is present in an amount of 70.0 to 30.0 wt %, preferably 65.0 to 35.0 wt %, more preferably 63.0 to 40.0 wt %.

In case that the propylene-1-butene copolymer is a bimodal copolymer comprising fractions (A) and (B), as described above, the propylene-1-butene copolymer exhibits a double melting peak ($Tm_1$ and $Tm_2$) in differential scanning calorimetry.

$Tm_1$ of the propylene-1-butene copolymer is preferably in the range of from 125 to 155° C., more preferably in the range of from 130 to 150° C. and even more preferably in the range of from 135 to 145° C., whereas $Tm_2$ of the propylene-1-butene copolymer is preferably in the range of from 100 to 140° C., more preferably in the range of from 105 to 138° C. and even more preferably in the range of 107 to 135° C.

Also the unimodal copolymers can show a double melting peak ($Tm_1$ and $Tm_2$) in differential scanning calorimetry in the above defined ranges.

In order to facilitate processing, especially film processing, it is also desirable that the propylene-1-butene random copolymer has a suitable crystallization temperature even in absence of any nucleating agents. Preferably, the propylene-1-butene random copolymer has a crystallization temperature Tc as determined by DSC (differential scanning calorimetry) according to ISO 11357 in the range of from 85° C. to 115° C., more preferably in the range of from 90° C. to 112° C., like in the range of from 95° C. to 111° C.

It is also preferred that the difference between melting temperature $Tm_1$ and crystallization temperature Tc, ($Tm_1$–Tc), is rather low. Said difference ($Tm_1$–Tc) shall preferably be less than 45° C., more preferably in the range of from 25° C. to 42° C., like in the range of from 28° C. to 40° C.

It has been found that the propylene-1-butene random copolymer as described above provides a new material suitable for blown films, which combines very good mechanical properties e.g. in terms of stiffness (measured by tensile modulus), with attractive sealing properties (e.g. in terms of a low sealing temperature). In particular, by tuning the comonomer distribution between the two copolymer fractions of the copolymer, it is possible to access a broader property range in terms of mechanical, sealing and optical properties than has previously been possible. The copolymer also possesses good sterilization behaviour, which is of particular importance in the food packaging industry. Sterilization behaviour is typically measured via changes in properties (e.g. mechanics (toughness) or optics) after the sterilization process In the present invention, a comparison of haze before and after sterilization is performed, the less the negative change, the better the sterilization.

In a preferred embodiment, the propylene-1-butene copolymer as defined above is preferably unimodal. In another preferred embodiment, the propylene-1-butene copolymer as defined above is preferably multimodal, more preferably bimodal, in view of comonomer content and/or $MFR_2$.

In addition, it is preferred that the propylene-1-butene copolymer as defined above is produced in the presence of the catalyst as defined below.

The propylene-1-butene random copolymer as described above may be prepared by any known process in the art.

The bimodal propylene-1-butene copolymer is preferably prepared by polymerizing propylene and 1-butene by a sequential polymerization process comprising at least two reactors connected in series in the presence of a metallocene catalyst. For unimodal propylene-1-butene random copolymer the polymerization can be done in one reactor or in two reactors, wherby the reaction conditions in the 2 subsequent reactors are chosen in a way that in both reactors the same polymer is produced, thus yielding a copolymer which is unimodal in view of comonomer content and/or MFR2.

In case that the propylene-1-butene copolymer is a bimodal copolymer comprising fractions (A) and (B), as described above, the bimodal propylene-1-butene copolymer is preferably produced in a multistage process wherein fractions (A) and (B) are produced in subsequent stages.

The properties of the fractions produced in a higher stage of the multistage process may be calculated as described in the Experimental part.

Thus, although not directly measurable on the multistage process products, the properties of the fractions produced in higher stages of such a multistage processes may be determined by applying the above method.

Multimodal propylene-1-butene copolymer produced in a multistage process are also designated as "in-situ" blends. The resulting end product consists of an intimate mixture of the polymers from the two or more reactors. These two polymers may have different molecular-weight-distribution curves, and/or they may differ in terms of comonomer content or type. The end product thus contains a mixture or two or more polymers with differing properties, i.e. it is a multimodal polymer mixture.

In a particularly preferred embodiment, the multimodal propylene-1-butene copolymer is prepared by a process comprising:

(i) polymerizing propylene and 1-butene in a first polymerization stage in the presence of a single site catalyst to prepare a first propylene-1-butene copolymer (A) having a MFR$_2$ from 0.5 to 20.0 g/10 min and a butene content of 2.0 to 10.0 wt %;

(ii) polymerizing propylene and 1-butene in a second polymerization stage in the presence of said catalyst and said first propylene-1-butene copolymer (A) to prepare said multimodal propylene-1-butene copolymer.

The first polymerization stage is preferably a bulk slurry polymerization step in liquid monomer.

The temperature in the first polymerization stages is typically from 60 to 100° C., preferably from 70 to 90° C. An excessively high temperature should be avoided to prevent partial dissolution of the polymer in the liquid monomer and the fouling of the reactor. The pressure is from 1 to 150 bar, preferably from 40 to 80 bar.

The slurry polymerization may be conducted in any known reactor used for slurry polymerization. Such reactors include a continuous stirred tank reactor and a loop reactor. It is especially preferred to conduct the polymerization in a loop reactor. In such reactors, the slurry is circulated with a high velocity along a closed pipe by using a circulation pump. Loop reactors are generally known in the art and examples are given, for instance, in U.S. Pat Nos. 4,582,816, 3,405,109, 3,324,093, Ep-A-479186 and U.S. Pat. No. 5,391,654. It is thus preferred to conduct the first polymerization stage as a slurry polymerization in a loop reactor.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and WO-A-2007/025640. The continuous withdrawal is advantageously combined with a suitable concentration method, as disclosed in EP-A-1310295 and EP-A-1591460. It is preferred to withdraw the slurry from the first polymerization stage continuously.

Hydrogen is typically introduced into the first polymerization stage for controlling the MFR$_2$ of the propylene butene copolymer (A). The amount of hydrogen needed to reach the desired MFR depends on the catalyst used and the polymerization conditions, as will be appreciated by the skilled worker.

The average residence time in the first polymerization stage is typically from 20 to 120 minutes, preferably from 30 to 80 minutes. As it is well known in the art, the average residence time T can be calculated from Equation 1 below:

$$\text{Residence Time } \tau = \frac{V_R}{Q_o} \quad \text{Equation 1}$$

where VR is the volume of the reaction space (in case of a loop reactor, the volume of the reactor, in case of the fluidized bed reactor, the volume of the fluidized bed) and Qo is the volumetric flow rate of the product stream (including the polymer product and the fluid reaction mixture).

The production rate is suitably controlled with the catalyst feed rate. It is also possible to influence the production rate by suitable selection of the monomer concentration. The desired monomer concentration can then be achieved by suitably adjusting the propylene feed rate.

The second polymerization stage is preferably a gas phase polymerization step, i.e. carried out in a gas-phase reactor. Any suitable gas phase reactor known in the art may be used, such as a fluidised bed gas phase reactor.

For gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen or low boiling point hydrocarbons such as propane together with monomer (e.g. ethylene).

A chain transfer agent (e.g. hydrogen) is typically added to the second polymerization stage.

The split between the first and second polymerization stages may be in the range 30:70 to 70:30, preferably 35:65 to 65:35.

A preferred multistage process is the above-identified slurry-gas phase process, such as developed by Borealis and known as the Borstar® technology. In this respect, reference is made to the EP applications EP 0887379 A1 and EP 0517868 A1.

The polymerization steps discussed above may be preceded by a prepolymerization step. The purpose of the prepolymerization is to polymerize a small amount of polymer onto the catalyst at a low temperature and/or a low monomer concentration. By prepolymerization it is possible to improve the performance of the catalyst in slurry and/or modify the properties of the final polymer. The prepolymerization step is typically conducted in slurry bulk mode in the liquid monomer.

The temperature in the prepolymerization step is typically from 0 to 90° C., preferably from 10 to 60° C. and more preferably from 15 to 35° C.

The pressure is not critical and is typically from 1 to 150 bar, preferably from 40 to 80 bar.

The amount of monomer is typically such that from 0.1 to 1000 grams of monomer per one gram of solid catalyst component is polymerized in the prepolymerization step. As the person skilled in the art knows, the catalyst particles recovered from a continuous prepolymerization reactor do not all contain the same amount of prepolymer. Instead, each particle has its own characteristic amount, which depends on the residence time of that particle in the prepolymerization reactor. As some particles remain in the reactor for a relatively long time and some for a relatively short time, then also the amount of prepolymer on different particles is different and some individual particles may contain an amount of prepolymer which is outside the above limits. However, the average amount of prepolymer on the catalyst typically is within the limits specified above.

The molecular weight of the prepolymer may be controlled by hydrogen as it is known in the art. Further, antistatic additives may be used to prevent the particles from adhering to each other or the walls of the reactor, as disclosed in WO-A-96/19503 and WO-A-96/32420.

The catalyst components are preferably all introduced to the prepolymerization step when a prepolymerization step is present. However, where the solid catalyst component and the cocatalyst can be fed separately it is possible that only a part of the cocatalyst is introduced into the prepolymerization stage and the remaining part into subsequent polymerization stages. Also, in such cases it is necessary to introduce so much cocatalyst into the prepolymerization stage that a sufficient polymerization reaction is obtained therein.

It is understood within the scope of the invention, that the amount of polymer produced in the prepolymerization typically lies within 0.5-5.0 wt % in respect to the final multimodal propylene-1-butene copolymer.

In case that the propylene-1-butene random copolymer is unimodal, as mentioned already above, the reaction conditions in the 2 subsequent reactors are chosen in a way that in both reactors the same polymer is produced, thus yielding a copolymer which is unimodal in view of comonomer content and/or $MFR_2$.

In case that the propylene-1-butene random copolymer is bimodal, the reaction conditions in the 2 subsequent reactors are chosen in a way that in the first reactor fraction (A) and in the second reactor fraction (B) is produced, thus yielding a copolymer which is bimodal in view of comonomer content and/or $MFR_2$.

The propylene-1-butene random copolymer is prepared in the presence of a single site catalyst (which term encompasses a metallocene and a non-metallocene catalyst). These terms have a well-known meaning. Most preferably, the catalyst is a metallocene.

Any metallocene catalyst capable of catalysing the formation of an olefinic polymer can be used. A suitable metallocene catalyst comprises a metallocene/activator reaction product impregnated in a porous support at maximum internal pore volume. The catalyst complex comprises a ligand which is typically bridged, and a transition metal of group IVa to VIa, and an organoaluminium compound. The catalytic metal compound is typically a metal halide.

Suitable metallocene compounds are those which have a formula $(Cp)_m R_n MR'_o X_p$, where Cp is an unsubstituted or substituted and/or fused homo or heterocyclopentadienyl, R is a group having 1-4 atoms and bridging two Cp rings, M is a transition metal of group 4, 5 or 6 in the Periodic Table of Elements (IUPAC, 1985), R' is C1-C2 hydrocarbyl or hydrocarboxy group and X is a halogen atom, wherein m is 1-3, n is 0 or 1, o is 0-3 and p is 0-3 and sum n+o+p corresponds the oxidation state of the transition metal M. The transition metal M is preferably zirconium, hafnium or titanium, most preferably zirconium.

Examples of suitable metallocene compounds include those of formula (I) or (II):

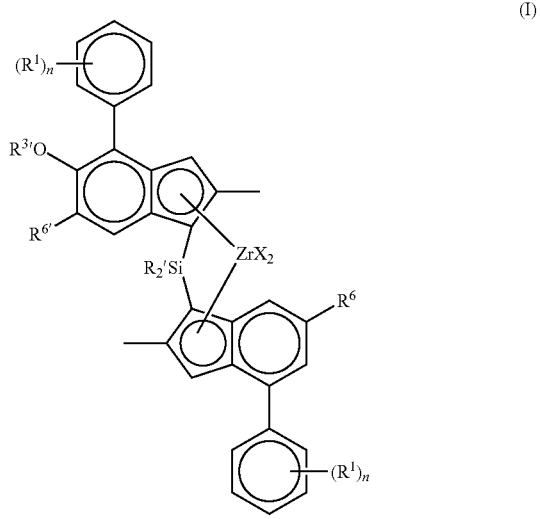

(I)

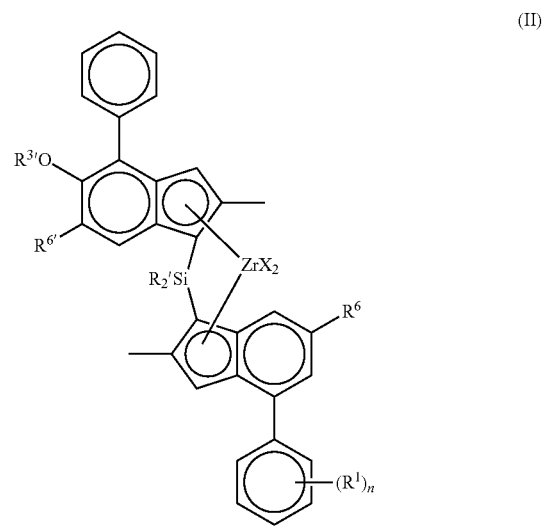

(II)

wherein each X is a sigma ligand, preferably each X is independently a hydrogen atom, a halogen atom, C1-6-alkoxy group, C1-6-alkyl, phenyl or benzyl group;

R' is independently a C1-6 alkyl or C3-10 cycloalkyl;

$R^1$ is independently C3-8 alkyl;

$R^6$ is hydrogen or a C3-8 alkyl group;

$R^{6'}$ is a C3-8 alkyl group or C6-10 aryl group, preferably a tertiary C4-8 alkyl group;

$R^{3'}$ is a C1-6 alkyl group, or C6-10 aryl group optionally substituted by one or more halo groups; and n is independently 0, 1 or 2.

Particular metallocene compounds include:

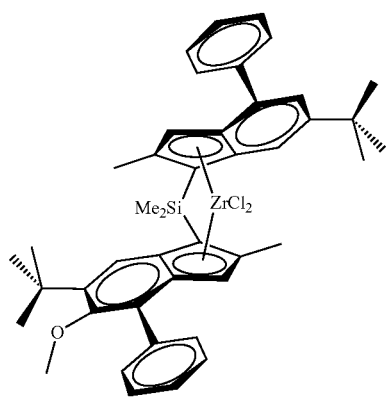

rac-anti-Me$_2$Si(2-Me-4-Ph-6-tBu-Ind)(2-Me-4-Ph-5-OMe-6-tBu-Ind)ZrCl$_2$

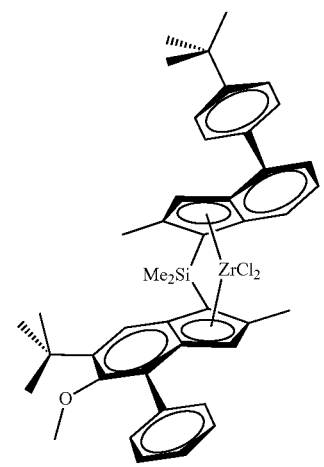

rac-anti-Me$_2$Si(2-Me-4-(p-tBuPh)-Ind)(2-Me-4-Ph-5-OMe-6-tBu-Ind)ZrCl$_2$

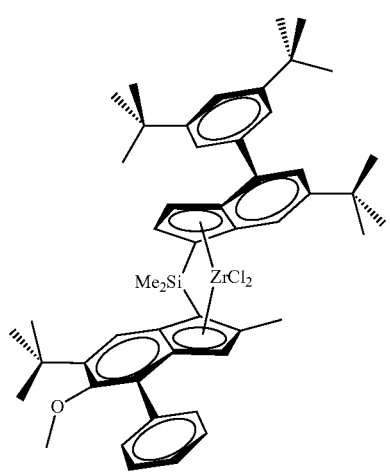

rac-anti-Me$_2$Si(2-Me-4-(3,5-di-tBuPh)-6-tBu-Ind)(2-Me-4-Ph-5-OMe-6-tBu-Ind)ZrCl$_2$ -continued Particular metallocene compounds include:

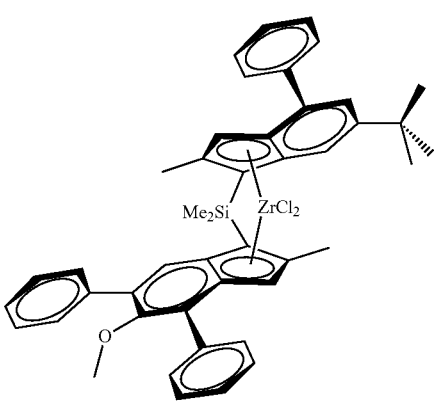

rac-anti-Me$_2$Si(2-Me-4-Ph-6-tBu-Ind)(2-Me-4,6-di-Ph-5-OMe-Ind)ZrCl$_2$

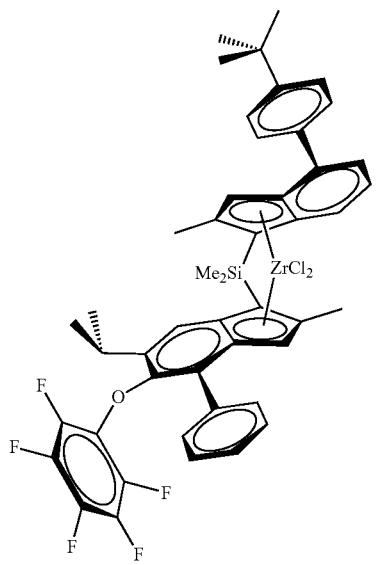

rac-anti-Me$_2$Si(2-Me-4-(p-tBuPh)-Ind)(2-Me-4-Ph-5-OC$_6$F$_5$)-6-iPr-Ind)ZrCl$_2$

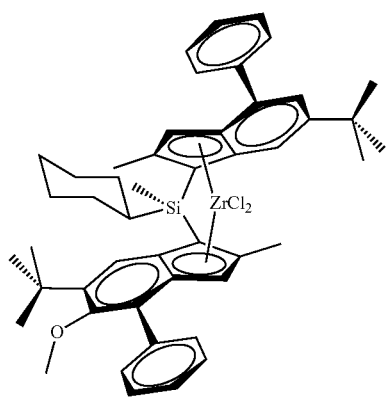

rac-anti-Me(CyHex)Si(2-Me-4-Ph-6-tBu-Ind)(2-Me-4-Ph-5-OMe-6-tBu-Ind)ZrCl$_2$

Particular metallocene compounds include:

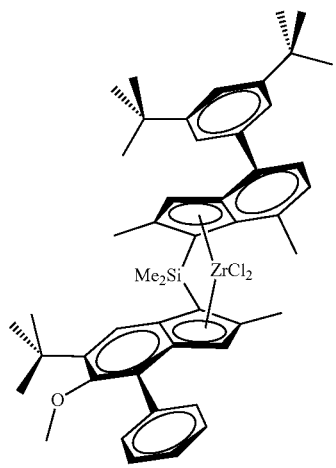

rac-anti-Me$_2$Si(2-Me-4-(3,5-di-tBuPh)-7-Me-Ind)(2-Me-4-Ph-5-OMe-6-tBu-Ind)ZrCl$_2$

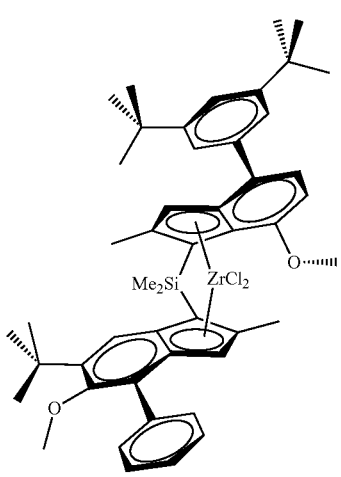

rac-anti-Me$_2$Si(2-Me-4-(3,5-di-tBuPh)-7-OMe-Ind)(2-Me-4-Ph-5-OMe-6-tBu-Ind)ZrCl$_2$

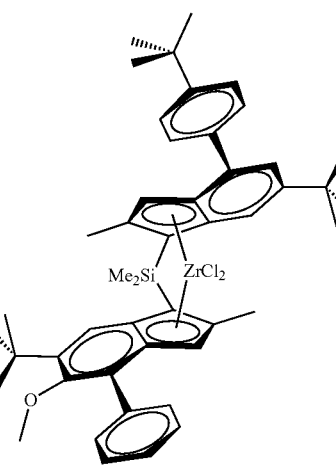

rac-anti-Me$_2$Si(2-Me-4-(p-tBuPh)-6-tBu-Ind)(2-Me-4-Ph-5-OMe-6-tBu-Ind)ZrCl$_2$ Particular metallocene compounds include:

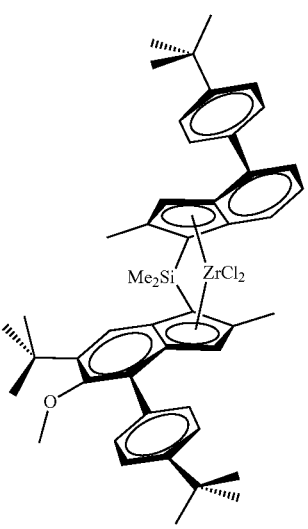

rac-anti-Me$_2$Si(2-Me-4-(p-tBuPh)-Ind)(2-Me-4-(4-tBuPh)-5-OMe-6-tBu-Ind)ZrCl$_2$

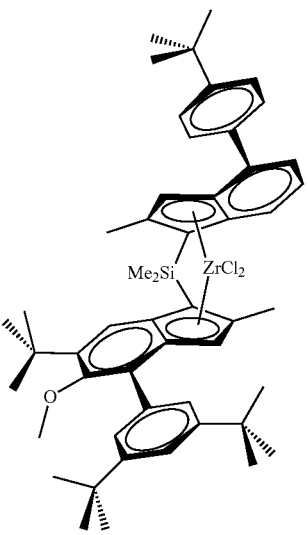

rac-anti-Me$_2$Si(2-Me-4-(p-tBuPh)-Ind)(2-Me-4-(3,5-tBu2Ph)-5-OMe-6-tBu-Ind)ZrCl$_2$

| Particular metallocene compounds include: |
|---|
| 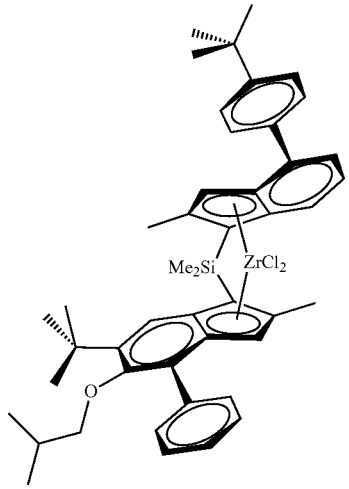 |
| rac-anti-Me$_2$Si(2-Me-4-(p-tBuPh)-Ind)(2-Me-4-Ph-5-OiBu-6-tBu-Ind)ZrCl$_2$ |

Alternatively, the metallocene compound may be selected from:

rac-anti-dimethylsilanediyl [2-methyl-4,7-bis-(3',5'-dimethyl-phenyl)-1,5,6,7-tetrahydro-s-indacen-1-yl][2-methyl-4-(3',5'-dimethylphenyl)-5-methoxy-6-tert-butylinden-1-yl]zirconium dichloride

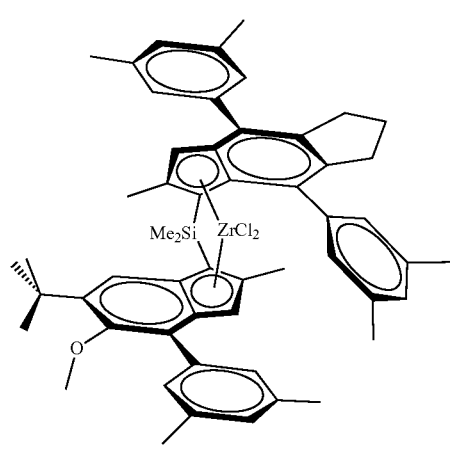

or anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride

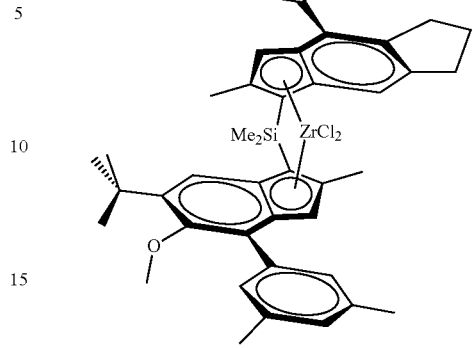

Most preferably rac-anti-Me2Si(2-Me-4-(p-tBuPh)-Ind)(2-Me-4-Ph-5-OMe-6-tBu-Ind)ZrCl2 is used.

Such metallocene catalysts are frequently used with catalyst activators or co-catalysts, e.g. alumoxanes such as methylaluminoxane, which are widely described in the literature.

The metallocene catalyst may be supported as is well known in the art. Any suitable support or carrier material can be used, which may be any porous, substantially inert support, such as an inorganic oxide or salt. In practice the support used is preferably a fine-grained inorganic oxide such as an inorganic oxide of an element of Group 2, 13 or 14 in the Periodic Table of Elements (IUPAC, 1985), most preferably silica, alumina or a mixture or derivative of these. Other inorganic oxides which can be used either alone or together with silica, alumina or silica-alumina, are magnesium oxide, titanium dioxide, zirconium oxide, aluminum phosphate etc.

Alternatively, the catalyst may be used in non-supported form or in solid form.

Non-supported catalyst systems, suitable for the present invention can be prepared in solution, for example in an aromatic solvent like toluene, by contacting the metallocene (as a solid or as a solution) with the cocatalyst(s), for example methylaluminoxane and/or a borane or a borate salt previously in an aromatic solvent, or can be prepared by sequentially adding the dissolved catalyst components to the polymerization medium.

The catalyst system of the invention in solid form, preferably in solid particulate form is generally free from an external carrier, however still being in solid form. By free from an external carrier is meant that the catalyst does not contain an external support, such as an inorganic support, for example, silica or alumina, or an organic polymeric support material.

In order to provide the catalyst system of the invention in solid form but without using an external carrier, it is preferred if a liquid/liquid emulsion system is used. The process involves forming dispersing catalyst components (i) (the complex) and (ii)+optionally (iii) the cocatalysts) in a solvent, and solidifying said dispersed droplets to form solid particles. In particular, the method involves preparing a solution of the catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles. This process enables the manufacture of active catalyst particles with improved morphology, e.g. with a predetermined particle size, spherical shape, compact structure, excellent surface properties and without using any added external porous support material, such as an inorganic oxide, e.g. silica. The catalyst particles can have a smooth surface, they may be compact in nature and catalyst active components can be distributed uniformly thorough the catalyst particles. Full disclosure of the necessary process steps can be found in, for example, WO03/051934.

All or part of the preparation steps can be done in a continuous manner. Reference is made to WO2006/069733 describing principles of such a continuous or semicontinuous preparation methods of the solid catalyst types, prepared via emulsion/solidification method. The formed catalyst preferably has good stability/kinetics in terms of longevity of reaction, high activity and the catalysts enable low ash contents.

The use of the heterogeneous, non-supported catalysts, (i.e. "self-supported" catalysts) might have, as a drawback, a tendency to dissolve to some extent in the polymerization media, i.e. some active catalyst components might leach out of the catalyst particles during slurry polymerization, whereby the original good morphology of the catalyst might be lost. These leached catalyst components are very active possibly causing problems during polymerization. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerization, which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerize" the catalyst before using it in polymerization process. It has to be noted that prepolymerization in this regard is part of the catalyst preparation process, being a step carried out after a solid catalyst is formed. This catalyst prepolymerization step is not part of the actual polymerization configuration, which might comprise a conventional process prepolymerization step as well. After the catalyst prepolymerization step, a solid catalyst is obtained and used in polymerization.

Catalyst "prepolymerization" takes place following the solidification step of the liquid-liquid emulsion process hereinbefore described. Prepolymerization may take place by known methods described in the art, such as that described in WO 2010/052263, WO 2010/052260 or WO 2010/052264. Use of the catalyst prepolymerization step offers the advantage of minimising leaching of catalyst components and thus local overheating.

The solvent employed in the processes of the invention may be any solvent suitable for use in olefin polymerization and is typically a mixture of hydrocarbons. Such solvents are well known in the art. Examples of solvents include hexane, cyclohexane, isohexane, n-heptane, C8, C9 isoparaffins and mixtures thereof.

In one embodiment, the polymerization is carried out in the presence of hydrogen. Hydrogen is typically employed to help control polymer properties, such as polymer molecular weight. In an alternative embodiment, hydrogen is not added in step i. The skilled worker will appreciate, however, that hydrogen may be generated during the polymerization process. Thus, the hydrogen present in the polymerization reaction mixture formed in step i. of the process may originate from hydrogen which has been added as a reactant and/or hydrogen produced as a side product during polymerization.

It will be appreciated that the propylene-1-butene random copolymers may contain standard polymer additives. These typically form less than 5.0 wt %, such as less than 2.0 wt % of the polymer material. Additives, such as antioxidants, phosphites, cling additives, pigments, colorants, fillers, antistatic agent, processing aids, clarifiers and the like may thus be added during the polymerization process. These additives are well known in the industry and their use will be familiar to the artisan. Any additives which are present may be added as an isolated raw material or in a mixture with a carrier polymer, i.e. in so called master batch.

In one embodiment, the propylene-1-butene random copolymers contain an alpha-nucleating agent in an amount of from 100 to 2000 ppm, preferably 500 to 1900 ppm and more preferably 800 to 1800 ppm based on the copolymer.

Any suitable α-nucleating agent or alpha-nucleating method known in the art can be used, like phosphate-based α-nucleating agent or sorbitol-based α-nucleating agent or salts of monocarboxylic acids and polycarboxylic acids, etc., like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4- dimethylbenzylidene)sorbitol (CAS No. 135861-56-2, commercially available as Millad 3988 of Milliken, USA).

The propylene-1-butene random copolymers used in the present invention are not subjected to any visbreaking step, meaning that the copolymers are free of peroxide residues and residues of other radical initiators.

The present invention is related to a blown film comprising at least 95.0 wt %, more preferably at least 97.0 wt % and even more preferably at least 99.0 wt % of the above described propylene-1-butene random copolymer, preferably the above described bimodal propylene-1-butene random copolymer.

Moreover, the films of the invention preferably consist of the propylene-1-butene copolymer of the invention as the sole polymer component. However, it is to be understood herein that the films may comprise further components such as additives, which may optionally be added in a mixture with a carrier polymer, i.e. in so called master batch.

The films of the invention may be multilayer or monolayer films, but are preferably monolayer films.

The tensile modulus of the blown film itself shall be rather high. Thus, the tensile modulus of the blown film based on the propylene butene random copolymer shall be at least 700 MPa, more preferably at least 800 MPa.

The tensile modulus determined according to ISO 527 at 23° C. on blown films with a thickness of 50 μm in machine direction as well as in transverse direction is therefore in the range of from 700 to 1800 MPa, preferably of from 800 to 1700 MPa, more preferably of from 900 to 1600 MPa and even more preferably of from 950 to 1500 MPa.

Films of the invention which comprise (e.g. consist of) the propylene-1-butene random copolymer, preferably the bimodal propylene-1-butene random copolymer have a sealing initiation temperature (SIT) (determined on 50 μm blown film as described in the experimental part) of 135° C. or less, such as 132° C. or less, more preferably 130° C. or less. Whilst the SIT is ideally as low as possible, typical lower limits might be 105° C., or 110 or 115° C.

Preferably, the films have a sealing initiation temperature (SIT) in the range of from 105° C. to 135° C., more preferably in the range of from 110° C. to 132° C., like in the range of from 115° C. to 130° C.

It is especially preferred that the difference between melting temperature $Tm_1$ and SIT, $(Tm_1-SIT)$, is rather high. Said $(Tm_1-SIT)$ shall be in the range of 10° C. to 25° C., preferably 12° C. to 22° C. and even more preferably 14° C. to 20° C..

The films furthermore have preferable a high hot tack force determined on 50 µm blown film (as described in the experimental part) of above 2.0 up to 6.0 N.

Preferably, the films have a high hot tack force in the range of from 2.2 to 5.5 N, more preferably in the range of from 2.5 to 5.0 N.

The films can furthermore have a haze (determined according to ASTM D 1003-00 on 50 µm blown film) before sterilization (steam sterilization at 121° C. for 30 min) of below 12.0%, preferably of below 10.0%, and more preferably of below 8.0%.

Thus, the haze of the films before sterilization is preferably in the range of from 0.1 to below 12.0%, more preferably in the range of from 0.2 to below 10.0%, and even more preferably in the range of from 0.3 to below 8.0%.

In addition, the films may have a clarity (determined according to ASTM D1003-00 on blown films with a thickness of 50 µm) before sterilization (steam sterilization at 121° C. for 30 min) of at least 90.0% up to 100.0%, preferably of at least 93.0% up to 100.0%.

Since the films according to the invention are also sterilizable, the films can furthermore have a haze (determined according to ASTM D 1003-00 on 50 µm blown film) after sterilization (steam sterilization at 121° C. for 30 min) of below 12.0%, preferably of below 10.0%, and more preferably of below 8.5%.

Thus, the haze of the films after sterilization is preferably in the range of from 0.5 to below 12.0%, more preferably in the range of from 0.8 to below 10.0%, and even more preferably in the range of from 1.0 to below 8.5%.

In addition, the films may have a clarity (determined according to ASTM D1003-00 on blown films with a thickness of 50 µm) after sterilization (steam sterilization at 121° C. for 30 min) of at least 90.0% up to 100.0%, preferably of at least 93.0% up to 100.0% and more preferably of at least 92.0% up to 100.0%.

Viewed from another aspect, it is a constant need to provide films, which not only show improvements in one or two of these mechanical or optical properties. So it is desired to provide products with a well-balanced and continuously improved overall performance.

Such an improvement in the overall performance of a blown film can be expressed by the optomechanical ability.

In view of the present invention, optomechanical abilty (OMA) is understood as the ratio of mechanical (especially dart-drop impact strength (DDI) and tensile (MD)) behaviour, to optical performance, namely haze, wherein the mechanical properties are targeted to be as high as possible and the optical performance in the sense of haze is desired to be as low as possible. The optomechanical ability can be determined by multiplying Tensile Modulus (MD) and dart-drop impact strength (DDI; determined according to ASTM D1709, method A on a 50 µm blown film) and putting this product in relation to haze determined on 50 µm blown film.

The optomechanical ability (OMA) is therefore determined according the formula given below:

$$OMA = \frac{\text{Tensile Modulus } (MD)[MPa] * DDI(g)}{\text{Haze } (50 \, \mu m)[\%]}$$

Thus in one further embodiment of the present invention, the optomechanical ability (OMA) of films determined on 50 µm blown film is at least 5000 [MPa*g/%] up to 45000 [MPa*g/%], preferably in the range of from 5100 [MPa*g/%] up to 40000 [MPa*g/%].

It will be appreciated that any parameter mentioned above is measured according to the detailed test given below. In any parameter where a narrower and broader embodiment are disclosed, those embodiments are disclosed in connection with the narrower and broader embodiments of other parameters.

For manufacturing the blown film, a melt of the propylene butene random copolymer according to the present invention is extruded through an annular die and blown into a tubular film.

Thus, the present invention is related to the manufacture of the inventive blown film by extrusion of the propylene butene random copolymer as defined herein by conventional blown film extrusion, i.e. the propylene butene random copolymer is extruded through a die, preferably circular die, followed by forming a bubble which is collapsed between nip rollers after solidification. The blown extrusion can preferably be effected at a temperature in the range 160 to 240° C., whereby cooling by water or preferably by blowing gas (generally air) is done at a temperature of 10 to 50° C. to provide a frost line height of 0.5 to 8 times the diameter of the die. The blow up ratio should generally be in the range of from 1.5 to 4, such as in the range of from 2 to 4 and preferably in the range of from 2.5 to 3.5.

Furthermore, the present invention is also directed to the use of the inventive blown film, as packaging material, in particular as a packaging material for food and/or medical products.

In addition, the present invention is related to articles comprising a blown film as defined herein.

Articles comprising the polypropylene composition of the present invention have sufficient thermal stability to enable sterilization treatment.

Therefore the present invention is also directed to a sterilizable or sterilized article, preferably to a sterilizable or sterilized film, like a sterilizable or sterilized blown film.

The invention will now be described with reference to the following non-limiting examples.

EXPERIMENTAL PART

A. Measuring Methods

The following definitions of terms and determination methods apply for the above general description of the invention as well as to the below examples unless otherwise defined.

Melt Flow Rate

The melt flow rate (MFR) was determined according to ISO 1133—Determination of the melt mass-flow rate (MFR) and melt volume-flow rate (MVR) of thermoplastics—Part 1: Standard method and is indicated in g/10 min. The MFR is an indication of the flowability, and hence the processability, of the polymer. The higher the melt flow rate, lower the viscosity of the polymer. The MFR$_2$ of polypropylene is determined at a temperature of 230° C. and a load of 2.16 kg.

Calculation of comonomer content of the second polymer fraction (B):

$$\frac{C(CP) - w(A) \times C(A)}{w(B)} = C(B) \quad (I)$$

wherein w(A) is the weight fraction [in wt %] of the first polymer fraction (A), w(B) is the weight fraction [in wt %] of second polymer fraction (B), C(A) is the comonomer content [in wt %] of the first polymer fraction (A), C(CP) is the comonomer content [in wt %] of the C3C4 random copolymer, C(B) is the calculated comonomer content [in wt %] of the second polymer fraction (B).

Calculation of melt flow rate MFR$_2$ (230° C.) of the polymer fraction (B):

$$MFR(B) = 10^{\left[\frac{\log(MFR(CP)) - w(A) \times \log(MFR(A))}{w(B)}\right]} \quad (II)$$

wherein w(A) is the weight fraction [in wt %] of the polymer fraction A w(B) is the weight fraction [in wt %] of the polymer fraction B, MFR(A) is the melt flow rate MFR$_2$ (230° C.) [g/10min] of the polymer fraction A, MFR(CP) is the melt flow rate MFR$_2$ (230° C.) [g/10min] of the C3C4 random copolymer, MFR(B) is the calculated melt flow rate MFR$_2$ (230° C.) [g/10min] of the polymer fraction B.

Quantification of microstructure by NMR spectroscopy

Quantitative nuclear-magnetic resonance (NMR) spectroscopy was used to quantify the comonomer content of the polymers.

Quantitative $^{13}$C{$^1$H} NMR spectra recorded in the molten-state using a Bruker Avance III 500 NMR spectrometer operating at 500.13 and 125.76 MHz for $^1$H and $^{13}$C respectively. All spectra were recorded using a $^{13}$C optimised 7 mm magic-angle spinning (MAS) probe head at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09} Standard single-pulse excitation was employed utilising the NOE at short recycle delays {klimke06, pollard04} and the RS-HEPT decoupling scheme. {fillip05, griffin07} A total of 1024 (1 k) transients were acquired per spectra using a 3 s recycle delay.

Quantitative $^{13}$C{$^1$H} NMR spectra were processed, integrated and relevant quantitative properties determined from the integrals. All chemical shifts are internally referenced to the methyl isotactic pentad (mmmm) at 21.85 ppm {randall89}.

Basic comonomer content method spectral analysis method:

Characteristic signals corresponding to the incorporation of 1-butene were observed {randall89} and the comonomer content quantified in the following way.

The amount of 1-butene incorporated in PPBPP isolated sequences was quantified using the integral of the αB2 sites at 43.6 ppm accounting for the number of reporting sites per comonomer:

B=I$_\alpha$/2

The amount of 1-butene incorporated in PPBBPP double consecutively sequences was quantified using the integral of the ααB2B2 site at 40.5 ppm accounting for the number of reporting sites per comonomer:

BB=2*I$_{\alpha\alpha}$

When double consecutive incorporation was observed the amount of 1-butene incorporated in PPBPP isolated sequences needed to be compensated due to the overlap of the signals αB2 and αB2B2 at 43.9 ppm:

B=(I$_\alpha$−2*I$_{\alpha\alpha}$)/2

The total 1-butene content was calculated based on the sum of isolated and consecutively incorporated 1-butene:

Btotal=B+BB

The amount of propene was quantified based on the main Sαα methylene sites at 46.7 ppm and compensating for the relative amount of αB2 and αB2B2 methylene unit of propene not accounted for (note B and BB count number of butene monomers per sequence not the number of sequences):

Ptotal=I$_{S\alpha\alpha}$+B+BB/2

The total mole fraction of 1-butene in the polymer was then calculated as:

fB=Btotal/(Btotal+Ptotal)

The full integral equation for the mole fraction of 1-butene in the polymer was:

fB=(((I$_\alpha$−2*+I$_{\alpha\alpha}$)/2)+(2*I$_{\alpha\alpha}$))/(I$_{S\alpha\alpha}$+((I$_\alpha$−2*I$_{\alpha\alpha}$)/2)+((2*I$_{\alpha\alpha}$)/2))+((I$_\alpha$−2*I$_{\alpha\alpha}$)/2)+(2*I$_{\alpha\alpha}$))

This simplifies to:

fB=(I$_\alpha$/2+I$_{\alpha\alpha}$)/(I$_{S\alpha\alpha}$+I$_\alpha$+I$_{\alpha\alpha}$)

The total incorporation of 1-butene in mole percent was calculated from the mole fraction in the usual manner:

B[mol %]=100*fB

The total incorporation of 1-butene in weight percent was calculated from the mole fraction in the standard manner:

B[wt %]=100*(fB*56.11)/((fB*56.11)+((1−fB)*42.08))

Details of these procedures can be found in Katja Klimke, Matthew Parkinson, Christian Piel, Walter Kaminsky Hans Wolfgang Spiess, Manfred Wilhelm, Macromol. Chem. Phys. 2006, 207, 382; Matthew Parkinson, Katja Klimke, Hans Wolfgang Spiess, Manfred Wilhelm, Macromol. Chem. Phys. 2007, 208, 2128; Patrice Castignolles, Robert Graf, Matthew Parkinson, Manfred Wilhelm, Marianne Gaborieau:, Polymer 2009, 50, 2373; M. Pollard, K. Klimke, R. Graf, H. W. Spiess, M. Wilhelm, 0. Sperber, C. Piel, W. Kaminsky, Macromolecules 2004, 37, 813; Xenia Filip, Carmen Tripon, Claudiu Filip, J. Magn. Reson. 2005, 176, 239;

John M. Griffin, Carmen Tripon, Ago Samoson, Claudiu Filip, Steven P. Brown, *Mag. Res. in Chem.* 2007, 45(S1), S198; J. Randall Rev. *Macromol. Chem. Phys.* 1989, C29, 201.

Determination of the C2- and C3-Content in Comparative Example CE1 by NMR

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Molecular Weight & Molecular Weight Distribution

Molecular weight averages (Mz, Mw and Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-1: 2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i/M_i)} \quad (3)$$

For a constant elution volume interval $\Delta V_i$, where $A_i$, and $M_i$, are the chromatographic peak slice area and polyolefin molecular weight (MW), respectively associated with the elution volume, $V_i$, where N is equal to the number of data points obtained from the chromatogram between the integration limits.

A high temperature GPC instrument, equipped with either infrared (IR) detector (IR4 or IR5 from PolymerChar (Valencia, Spain) or differential refractometer (RI) from Agilent Technologies, equipped with 3×Agilent-PLgel Olexis and 1×Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 µL of sample solution was injected per analysis. Data collection was performed using either Agilent Cirrus software version 3.3 or PolymerChar GPC-IR control software.

The column set was calibrated using universal calibration (according to ISO 16014-2:2003) with 19 narrow MWD polystyrene (PS) standards in the range of 0,5 kg/mol to 11 500 kg/mol. The PS standards were dissolved at room temperature over several hours. The conversion of the polystyrene peak molecular weight to polyolefin molecular weights is accomplished by using the Mark Houwink equation and the following Mark Houwink constants:

$K_{PS}=19\times10^{-3}$ mL/g, $\alpha_{PS}=0.655$ $K_{PE}=39\times10^{-3}$ mL/g, $\alpha_{PE}=0.725$ $K_{PP}=19\times10^{-3}$ mL/g, $\alpha_{PP}=0.725$ A third order polynomial fit was used to fit the calibration data. All samples were prepared in the concentration range of 0,5-1 mg/ml and dissolved at 160° C. for 2.5 hours for PP or 3 hours for PE under continuous gentle shaking.

Xylene Cold Solubles (XCS)

The xylene soluble (XS) fraction as defined and described in the present invention was determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25 +/−0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

XS %=$(100*m*V_0)/(m_0*v)$; $m_0$=initial polymer amount (g); m=weight of residue (g); $V_0$=initial volume (ml); v=volume of analysed sample (ml).

C6 FDA

It is measured based on FDA section 177.1520. 1 g of a polymer film of 100 μm thickness is added to 400 ml hexane at 50° C. for 2 hours while stirring with a reflux cooler. After 2 hours the mixture is immediately filtered on a filter paper. The precipitate is collected in an aluminium recipient and the residual hexane is evaporated on a steam bath under N2 flow. The amount of hexane solubles is determined by the formula ((wt. sample+wt. crucible)−(wt crucible))/(wt. sample)×100%.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature ($T_c$) and heat of crystallization ($H_c$) are determined from the cooling step, while melting temperature ($T_m$) and melt enthalpy (Hm) are determined from the second heating step.

Throughout the patent the term Tc or (Tcr) is understood as Peak temperature of crystallization as determined by DSC at a cooling rate of 10 K/min.

Flexural Modulus

The flexural modulus was determined in 3-point-bending at 23° C. according to ISO 178 on 80×10×4 mm³ test bars injection moulded in line with EN ISO 1873-2.

Notched Impact Strength (NIS):

The Charpy notched impact strength (NIS) was measured according to ISO 179 1eA at +23° C., using injection moulded bar test specimens of 80×10×4 mm³ prepared in accordance with EN ISO 1873-2.

Haze

Haze is determined according to ASTM D1003-00 on 60×60×1 mm³ plaques injection moulded in line with EN ISO 1873-2 and indicated as $Haze_1$ Haze and clarity for films were determined according to ASTM D1003-00 on blown films with a thickness of 50 μm produced as indicated below.

Film Production

All film properties (except hexane solubles) were determined on monolayer blown films of 50 μm thickness produced on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness of 50 μm, with a 2.5 blow-up ratio and an output rate of about 8 kilograms per hour (kg/h).

Sterilization

Steam sterilization was performed in a Systec D series machine (Systec Inc., USA). The samples were heated up at a heating rate of 5° C./min starting from 23° C. After having been kept for 30 min at 121° C., they were removed immediately from the steam sterilizer and stored at room temperature until being processed further.

Hot Tack Force

The hot-tack force was determined according to ASTM F1921-12—Method B on a J&B Hot-Tack Tester on a 50 μm thickness film produced on a monolayer cast film line. All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions:

Film Specimen width: 25.4 mm.

Seal bar length: 50 mm; Seal bar width: 5 mm; Seal bar shape: flat

Seal Pressure: 0.3 N/mm², Seal Time: 0.5sec; Cool time: 99 sec; Peel Speed: 200 mm/sec.

Start temperature: 90° C.; End temperature: 140° C.; Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve. The hot tack force (HTF) is evaluated from the curve as the highest force (maximum peak value) with failure mode "peel".

Sealing initiation temperature (SIT); (sealing end temperature (SET), sealing range)

The sealing temperature range is the temperature range, in which the films can be sealed according to conditions given below. The lower limit (heat sealing initiation temperature (SIT)) is the sealing temperature at which a sealing strength of >5 N is achieved. The upper limit (sealing end temperature (SET)) is reached, when the films stick to the sealing device.

The sealing range was determined on a J&B Universal Sealing Machine Type 3000 with a film of 50 μm thickness with the following further parameters:
Specimen width: 25.4 mm
Seal Pressure: 0.1 N/mm$^2$
Seal Time: 0.1 s
Cool time: 99 s
Peel Speed: 10 mm/s
Start temperature: 80° C.
End temperature: 150° C.
Increments: 10° C.

The specimen is sealed inside to inside at each sealbar temperature and seal strength (force) is determined at each step. The temperature is determined at which the seal strength reaches 5 N.

Tensile Modulus

Tensile Modulus in machine and transverse direction are determined according to ISO 527-3 at 23° C. on blown films of 50 μm thickness produced on a monolayer blown film line with a melt temperature of 220° C. and a chill roll temperature of 20° C. with a thickness of 50 μm produced as indicated below. Testing was performed at a cross head speed of 1 mm/min.

Dart-Drop Impact Strength (DDI)

DDI was measured using ASTM D1709, method A (Alternative Testing Technique) from the film samples. A dart with a 38 mm diameter hemispherical head was dropped from a height of 0.66 m onto a film clamped over a hole. Successive sets of twenty specimens are tested. One weight was used for each set and the weight is increased (or decreased) from set to set by uniform increments. The weight resulting in failure of 50% of the specimens is calculated and reported.

Optomechnical Ability (OMA)

Optomechnical ability (OMA) is understood as the ratio of mechanical (especially dart-drop strength (DDI) and tensile (MD)) behaviour, to optical performance, namely haze, wherein the mechanical properties are targeted to be as high as possible and the optical performance in the sense of haze is desired to be as low as possible.

The optomechanical ability (OMA) is determined according the formula given below:

$$OMA = \frac{\text{Tensile Modulus } (MD)[MPa] * DDI(g)}{\text{Haze } (50 \, \mu m)[\%]}$$

Haze value before sterilization

B. Experimental

Catalyst:

The catalyst used in the polymerization processes for the C3C4 random copolymer composition of the inventive example (IE1-IE3) was prepared as follows: The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride) has been synthesized as described in WO 2013/007650.

The catalyst was prepared using metallocene MC1 and a catalyst system of MAO and trityl tetrakis(pentafluorophenyl)borate according to Catalyst 3 of WO 2015/11135 with the proviso that the surfactant is 2,3,3,3-tetrafluoro-2-(1,1,2,2,3,3,3-heptafluoropropoxy)-1-propanol.

Production of bimodal propylene-1-butene random copolymers for Inventive Examples 1 to 4 (IE1 to IE3)

The copolymers for the inventive examples (1E1 to 1E3) were prepared in a two stage polymerization process, under the conditions outlined in Table 1, using a catalyst as defined above. Properties of the various fractions and final multimodal copolymers are also presented in Table 1. Film properties are shown in Table 4.

TABLE 1

Production Data for bimodal propylene-1-butene random copolymers

| | Unit | IE1 | IE2 | IE3 |
|---|---|---|---|---|
| Prepolymerizer | | | | |
| Temperature | [° C.] | 20 | 20 | 20 |
| Pressure | [kPa] | 4918 | 4918 | 4918 |
| Residence time | [h] | 0.3 | 0.3 | 0.3 |
| Loop reactor | | | | |
| Temperature | [° C.] | 75 | 75 | 75 |
| Pressure | [kPa] | 4868 | 4869 | 4870 |
| Residence time | [h] | 0.4 | 0.4 | 0.4 |
| Feed H2/C3 ratio | [mol/kmol] | 0.1 | 0.1 | 0.1 |
| Feed C4/C3 ratio | [mol/kmol] | 28.4 | 29.9 | 30.2 |
| Feed C2/C3 ratio | [mol/kmol] | 0.0 | 0.0 | 0.0 |
| Split | [wt %] | 45 | 39 | 38 |
| MFR$_2$ | [g/10 min] | 2.0 | 2.0 | 2.0 |
| C4 content of fraction A | [wt %] | 5.0 | 5.5 | 5.5 |
| First GPR | | | | |
| Temperature | [° C.] | 80 | 80 | 80 |
| Pressure | [kPa] | 2499 | 2500 | 2498 |
| Residence time | [h] | 0.5 | 0.6 | 0.6 |
| Feed H2/C3 ratio | [mol/kmol] | 1.0 | 1.1 | 1.1 |
| Feed C2/C3 ratio | [mol/kmol] | 0.0 | 0.0 | 0.0 |
| Feed C4/C3 ratio | [mol/kmol] | 26 | 60 | 107 |
| Split | [wt %] | 55 | 61 | 62 |
| MFR$_2$ | [g/10 min] | 1.2 | 1.7 | 1.9 |
| C4 content of fraction B | [wt %] | 3.9 | 7.3 | 11.3 |
| C4 content after GPR | [wt %] | 4.4 | 6.6 | 9.1 |
| Pellet | | | | |
| C4 total | [wt %] | 4.4 | 6.6 | 9.1 |
| MFR$_2$ | [g/10 min] | 1.0 | 1.6 | 1.8 |
| MWD | [—] | 3.9 | 3.8 | 3.7 |
| Tc | [° C.] | 108 | 102 | 100 |
| Tm$_1$ | [° C.] | 143 | 139 | 137 |
| Tm$_2$ | [° C.] | 128 | 121 | 109 |
| Tm$_1$ − Tc | [° C.] | 35 | 37 | 37 |
| XCS | [wt %] | 0.74 | 0.71 | 1.24 |
| C6 FDA | [wt %] | 0.54 | 0.48 | 0.56 |
| Flexural modulus | [MPa] | 1227 | 1015 | 838 |
| NIS 23° C. | [kJ/m$^2$] | 4.7 | 4.6 | 4.67 |
| Haze$_1$ | [%] | 44 | 42 | 45 |

The pelletization was done on a ZSK 32 twin screw extruder. The desired amount of copolymer powder, additives (1000 ppm of Irganox B215 supplied by BASF, being a 1:2-mixture of Pentaerythrityl-tetrakis(3-(3',5'-di-tert.butyl-4-hydroxyphenyl)-propionate, CAS-no. 6683-19-8, and Tris (2,4-di-t-butylphenyl) phosphite, CAS-no. 31570-04-4), and 500 ppm of calcium stearate from Baerlocher) were mixed and extruder at 220° C., with a throughput of 100 kg/h.

For Inventive Example 4, a unimodal propylene-1-butene copolymer was prepared using the catalyst described above. Details see Table 2:

TABLE 2

Production Data for unimodal propylene-1-butene random copolymers

| | Unit | IE4 | IE5* |
|---|---|---|---|
| Prepolymerizer | | | |
| Temperature | [° C.] | 20 | |
| Pressure | [kPa] | 3850 | |
| Residence time | [h] | 0.3 | |
| Loop reactor | | | |
| Temperature | [° C.] | 70 | |
| Pressure | [kPa] | 4530 | |
| Residence time | [h] | 0.8 | |
| Feed H2/C3 ratio | [mol/kmol] | 0.1 | |
| Feed C4/C3 ratio | [mol/kmol] | 33 | |
| Feed C2/C3 ratio | [mol/kmol] | 0.0 | |
| Split | [wt %] | 100 | |
| MFR$_2$ | [g/10 min] | 1.7 | |
| C4 content | [wt %] | 6.1 | |
| First GPR | | Not in use | |
| Pellet | | | |
| C4 total | [wt %] | 6.1 | 6.1 |
| MFR$_2$ | [g/10 min] | 1.8 | 1.8 |
| MWD | | 3.5 | 3.5 |
| Tc | [° C.] | 104 | 110 |
| Tm$_1$ | [° C.] | 139 | 140 |
| Tm$_2$ | [° C.] | 132 | 128 |
| Tm$_1$ – Tc | [° C.] | 35 | 30 |
| XCS | [wt %] | 1.6 | 1.4 |
| C6 FDA | [wt %] | 1.0 | 0.85 |
| Flexural modulus | [MPa] | 1075 | 1255 |
| NIS 23° C. | [kJ/m$^2$] | 5.1 | 4.2 |
| Haze$_1$ | [%] | 22.0 | 10.5 |

The pelletization was done on a ZSK 32 twin screw extruder. The desired amount of copolymer powder, additives (1000 ppm of Irganox B215 supplied by BASF, being a 1:2-mixture of Pentaerythrityl-tetrakis(3-(3',5'-di-tert.butyl-4-hydroxyphenyl)-propionate, CAS-no. 6683-19-8, and Tris (2,4-di-t-butylphenyl) phosphite, CAS-no. 31570-04-4), and 500 ppm of calcium stearate from Baerlocher) were mixed and extruder at 220° C., with a throughput of 100 kg/h.

For Inventive Example 5 (1E5) 1500 ppm of the nucleating agent NA-21 (a mixture of aluminiumhydroxy-bis[2,2'-methylene-bis(4,6-di-t-butylphenyl)phosphate] and lithium myristate, supplied by Adeka Palmarole, France) have been additionally added to the polymer of 1E4.

For Comparative Example 1 (CE1) a Ziegler-Natta catalyzed propylene-ethylene random copolymer has been produced.

The catalyst used in the polymerization process for the propylene-ethylene random copolymer of the comparative example (CE1) was produced as follows:
Used chemicals:
20% solution in toluene of butyl ethyl magnesium (Mg(Bu)(Et), BEM), provided by Chemtura
 2-ethylhexanol, provided by Amphochem
 3-Butoxy-2-propanol-(DOWANOL™ PnB), provided by Dow
 bis(2-ethylhexyl)citraconate, provided by SynphaBase
 TiCl4, provided by Millenium Chemicals
 Toluene, provided by Aspokem
 Viscoplex® 1-254, provided by Evonik
 Heptane, provided by Chevron
Preparation of a Mg Complex
First a magnesium alkoxide solution was prepared by adding, with stirring (70 rpm), into 1 l kg of a 20 wt-% solution in toluene of butyl ethyl magnesium (Mg(Bu)(Et), BEM), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg g of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of TiCl4 and 1.1 kg of toluene were added into a 20 l stainless steel reactor. Under 350 rpm mixing and keeping the temperature at 0° C., 14.5 kg of the Mg complex prepared in example 1 was added during 1.5 hours. 1.7 l of Viscoplex®1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away.

Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The solid catalyst component was used along with tri-ethyl-aluminium (TEAL) as co-catalyst and dicyclo pentyl dimethoxy silane (D-donor) as donor.

The aluminium to donor ratio, the aluminium to titanium ratio and the polymerization conditions of CE1 are indicated in table 3.

TABLE 3

Preparation of Comparative Example

| | | CE1 | CE2** |
|---|---|---|---|
| Prepolymerization | | | |
| Temperature | [° C.] | 20 | |
| Al/Ti | [mol/mol] | 582 | |
| Al/Donor | [mol/mol] | 8 | |
| Loop | | | |
| Temperature | [° C.] | 75 | |
| H$_2$/C$_3$ feed ratio | [mol/kmol] | 0.94 | |
| C$_2$/C$_3$ feed ratio | [mol/kmol] | 18.16 | |
| MFR$_2$ | [g/10 min] | 2.9 | |
| C2 | [wt %] | 3.3 | |
| Loop split | [wt.-%] | 58 | |
| GPR | | | |
| Temperature | [° C.] | 85 | |
| H$_2$/C$_3$ feed ratio | [mol/kmol] | 2.7 | |
| C$_2$/C$_3$ feed ratio | [mol/kmol] | 30.6 | |
| GPR split | [wt.-%] | 42 | |
| MFR$_2$ | [g/10 min] | 1.9 | |
| C2 after GPR | [wt %] | 4.3 | |
| Pellets | | | |
| C2 total | [wt %] | 4.4 | 4.4 |
| MFR$_2$ | [g/10 min] | 1.8 | 1.8 |
| MWD | [—] | 5.0 | 5.0 |
| Tc | [° C.] | 99 | 112 |
| Tm$_1$ | [° C.] | 139 | 144 |
| Tm$_2$ | [° C.] | — | — |
| Tm$_1$ – Tc | [° C.] | 40 | 32 |
| XCS | [wt %] | 7.5 | 7.2 |
| C6 FDA | [wt %] | 1.66 | 2.16 |
| Flexural modulus | [MPa] | 786 | 930 |
| NIS 23° C. | [kJ/m$^2$] | 6.23 | 17.9 |
| Haze$_1$ | [%] | n.m. | 13 |

The pelletization was done on a ZSK 32 twin screw extruder. The desired amount of copolymer powder, additives (1000 ppm of B215 supplied by BASF, being a 1:2-mixture of Pentaerythrityl-tetrakis(3-(3′,5′-di-tert. butyl-4-hydroxyphenyl)-propionate, CAS-no. 6683-19-8, and Tris (2,4-di-t-butylphenyl) phosphite, CAS-no. 31570-04-4), and 500 ppm of calcium stearate from Baerlocher) were mixed and extruder at 220° C., with a throughput of 100 kg/h.

For Comparative Example 2 (CE2) 1500 ppm of the nucleating agent NA-21 (a mixture of aluminiumhydroxy-bis[2,2′-methylene-bis(4,6-di-t-butylphenyl)phosphate] and lithium myristate, supplied by Adeka Palmarole, France) have been additionally added to the polymer of CE1.

TABLE 4

Film properties for Inventive and Comparative propylene copolymers

|  |  | IE1 | IE2 | IE3 | IE4 | IE5 | IE6 | CE1 | CE2 |
|---|---|---|---|---|---|---|---|---|---|
| TM/MD | MPa | 1389 | 1196 | 1059 | 998 | 1129 | 1345 | 910 | 958 |
| TM/TD | MPa | 1377 | 1175 | 1001 | 967 | 1092 | 1263 | 920 | 976 |
| DDI | g | 30 | 38 | 48 | 56 | 37 | 35 | 44 | 47 |
| Haze/b.s. | % | 7.2 | 5.2 | 4.8 | 5.8 | 6.7 | 155 | 22.5 | 8.2 |
| Haze/a.s. | % | 8.1 | 6.7 | 6.3 | 6.7 | 7.1 | 1.4 | 15.8 | 8.6 |
| Clarity/b.s. | % | 91.5 | 99.2 | 99.3 | 99.1 | 99.0 | 99.6 | 89.0 | 94.8 |
| Clarity/a.s. | % | 93.0 | 99.0 | 99.3 | 99.2 | 99.0 | 99.7 | 86.1 | 92.5 |
| SIT | ° C. | 128 | 122 | 118 | 117 | 122 | 123 | 125 | 126 |
| HTF | N | 2.99 | 3.44 | 3.76 | 3.93 | 2.53 | 3.54 | 1.87 | 2.3 |
| $Tm_1$ – SIT | ° C. | 15 | 17 | 19 | 20 | 17 | 17 | 14 | 18 |
| OMA |  | 5788 | 8740 | 10590 | 9635 | 6235 | 31383 | 1780 | 5491 |

(TM—tensile modulus, MD—machine direction, TD—transverse direction, b.s.—before sterilization, a.s.—after sterilization, HTF hot tack force)

From the above table it can be clearly seen that the inventive blown films base on the specific propylene-1-butene random copolymers, show an advantageous combination of low sealing initiation temperature (SIT), high hot-tack and good optical properties, like low haze and high clarity. Furthermore, such films have low C6 solubles and an improved overall performance, i.e. high OMA.

The invention claimed is:

1. Blown film comprising at least 95.0 wt % of a propylene-1-butene random copolymer, the propylene-1-butene random copolymer having
   a) a melt flow rate (MFR2; 230° C./2.16 kg; measured according to ISO 1133) in the range of from 0.5 to below 4.0 g/10 min,
   b) a 1-butene content in the range of from 2.0 to 15.0 wt % based on the total weight of the propylene-1-butene random copolymer and
   c) a xylene cold soluble (XCS) fraction measured according to ISO 16152 at 25° C. in the range of from 0.10 to 2.80 wt %,
   d) a molecular weight distribution (Mw/Mn) of 2.0 to less than 4.5,
   e) a double melting peak ($Tm_1$ and $Tm_2$) in differential scanning calorimetry, wherein $Tm_1$ of the propylene-1-butene copolymer is in the range of from 125 to 145° C., and wherein $Tm_2$ of the propylene-1-butene copolymer is in the range of from 100 to 140° C., and
   f) wherein said copolymer is prepared by using a single site catalyst, said blown film having
   i) a Tensile modulus, in machine and transverse direction according to ISO 527-3 at 23° C. measured on 50 μm blown films, in the range of from 700 to 1800 MPa.

2. Blown film according to claim 1, wherein the propylene-1-butene random copolymer contains an alpha-nucleating agent in an amount of from 100 to 2,000 ppm based on the total weight of the copolymer.

3. Blown film according to claim 1, wherein said propylene-1-butene random copolymer comprises:
   30.0 to 70.0 wt % based on the total weight of the propylene-1-butene random copolymer of a propylene-1-butene copolymer (A) having an MFR2 of 0.5 to 20.0 g/10 min and a 1-butene content of 2.0 to 10.0 wt % based on the total weight of the propylene-1-butene random copolymer (A); and
   70.0 to 30.0 wt % based on the total weight of the propylene-1-butene random copolymer of a propylene butene copolymer (B) having an MFR2 of 0.5 to 20.0 g/10 min and a 1-butene content of 3.5 to 20.0 wt % based on the total weight of the propylene-1-butene copolymer (B);
   wherein copolymers (A) and (B) are different and the amount of (A) and (B) sums up to 100.0%.

4. Blown film according to claim 1, wherein the propylene-1-butene random copolymer has a crystallization temperature $T_c$ as determined by DSC (differential scanning calorimetry) according to ISO 11357 in the range of from 85° C. to 115° C., and wherein the difference between melting temperature $Tm_1$ and crystallization temperature Tc, ($Tm_1$-$T_c$), is in the range of from 25° C. to 42° C.

5. Blown film according to claim 1, wherein the propylene-1-butene random copolymer has a flexural modulus, determined according to ISO 178, in the range of from 700 to 1800 MPa.

6. Blown film according to claim 1, wherein the propylene-1-butene random copolymer has a Charpy notched impact strength at 23° C., determined according to ISO 179 1eA, in the range of from 2.0 kJ/m$^2$ to 10.0 kJ/m$^2$ and/or a haze measured according to ASTM D1033 on a 1.0 mm thick plaque in the range of from 5.0 to below 70.0%.

7. Blown film according to claim 1, wherein the propylene-1-butene random copolymer has an amount of hexane hot solubles (C6 FDA) measured on a 100 μm thick blown film according to FDA 177.1520 in the range of from 0.1 to less than 2.0 wt %.

8. Blown film according to claim 6, wherein the film has a haze measured according to ASTM D1033 on a 50 μm blown film in the range of from 0.1 to below 12.0%.

9. Blown film according to claim 1, wherein the film has an optomechanical ability (OMA) determined on a 50 μm blown film according the formula given below:

$$OMA = \frac{\text{Tensile Modulus } (MD)[MPa] * DDI(g)}{\text{Haze }(50\,\mu m)[\%]}$$

of at least 5000 [MPa*g/%] up to 45000 [MPa*g/%], wherein the Tensile Modulus in machine direction is measured according to ISO 527-3 at 23° C. on 50 μm blown films, DDI is the dart-drop impact strength determined according to ASTM D1709, method A on a 50 μm blown film and haze is measured according to ASTM D1033 on a 50 μm blown film.

10. Blown film according to claim 1, wherein the film has a sealing initiation temperature (SIT), measured on a 50 μm blown film, in the range of 105 to 135° C.

11. Blown film according to claim 2, wherein the film has a hot-tack force determined on 50 μm blown film in the range of from 2.0 to 6.0 N.

12. Blown film according to claim 6, wherein the film has a haze after sterilization (steam sterilization at 121° C. for 30 min) determined according to ASTM D 1003-00 measured on a 50 μm blown film in the range of from 0.5 to below 12.0%.

13. Blown film according to claim 10, wherein the film has a clarity (determined according to ASTM D1003-00 on blow films with a thickness of 50 μm) of at least 90.0%, and a clarity (determined according to ASTM D1003-00 on blown films with a thickness of 50 μm) after sterilization (steam sterilization at 121° C. for 30 min) of at least 90.0%.

14. Blown film according to claim 1, wherein the film is a monolayer film.

15. The blown film of claim 1, wherein the propylene-1-butene random copolymer exhibits a double melting peak ($Tm_1$ and $Tm_2$) in differential scanning calorimetry, wherein $Tm_1$ of the propylene-1-butene copolymer is in the range of from 130 to 145° C., and wherein $Tm_2$ of the propylene-1-butene copolymer is in the range of from 105 to 138° C.

16. The blown film of claim 1, wherein the propylene-1-butene random copolymer exhibits a double melting peak ($Tm_1$ and $Tm_2$) in differential scanning calorimetry, wherein $Tm_1$ of the propylene-1-butene copolymer is in the range of from 135 to 145° C., and wherein $Tm_2$ of the propylene-1-butene copolymer is in the range of from 107 to 135° C.

17. Blown film according to claim 1, wherein the propylene-1-butene random copolymer has a crystallization temperature $T_c$ as determined by DSC (differential scanning calorimetry) according to ISO 11357 in the range of from 90° C. to 112° C., and wherein the difference between melting temperature $Tm_1$ and crystallization temperature $T_c$, ($Tm_1$-$T_c$), is in the range of from 28° C. to 40° C.

18. Blown film according to claim 1, wherein the propylene-1-butene random copolymer has a flexural modulus, determined according to ISO 178, in the range of from 800 to 1400 MPa.

19. Blown film according to claim 1, wherein the propylene-1-butene random copolymer has a Charpy notched impact strength at 23° C., determined according to ISO 179 1eA, in the range of from 3.0 kJ/m² to 7.0 kJ/m² and/or
a haze measured according to ASTM D1033 on a 1.0 mm thick plaque in the range of from 10 to 55.0%.

\* \* \* \* \*